(12) United States Patent
Klymenko et al.

(10) Patent No.: US 9,051,979 B2
(45) Date of Patent: Jun. 9, 2015

(54) METHOD AND DEVICE FOR LEAK TESTING IN AN AUTOMATED ELECTROHYDRAULIC CLUTCH SYSTEM IN A MOTOR VEHICLE

(75) Inventors: Mykhaylo Klymenko, Gerlingen (DE); Manuel Schnitzer, Altenrlet (DE); Rene Schenk, Heilbronn (DE); Kaspar Schmoll Genannt Eisenwerth, Vaihingen-Horrheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 13/515,387

(22) PCT Filed: Dec. 1, 2010

(86) PCT No.: PCT/EP2010/068608
§ 371 (c)(1),
(2), (4) Date: Aug. 24, 2012

(87) PCT Pub. No.: WO2011/085862
PCT Pub. Date: Jul. 21, 2011

(65) Prior Publication Data
US 2012/0312080 A1 Dec. 13, 2012

(30) Foreign Application Priority Data
Dec. 22, 2009 (DE) .......... 10 2009 055 161

(51) Int. Cl.
*G01M 3/26* (2006.01)
*F16D 48/06* (2006.01)

(52) U.S. Cl.
CPC .............. *F16D 48/066* (2013.01); *G01M 3/26* (2013.01); *F16D 2500/1024* (2013.01); *F16D 2500/3024* (2013.01); *F16D 2500/3166* (2013.01); *F16D 2500/511* (2013.01); *F16D 2500/70217* (2013.01); *F16D 2500/70235* (2013.01)

(58) Field of Classification Search
CPC ..... G01M 3/025; G01M 3/26; G01M 3/2815; G01M 3/3263; F16D 2500/511; F16D 2500/3024; F16D 2500/70217
See application file for complete search history.

(56) References Cited

U.S. PATENT DOCUMENTS

| | | | | |
|---|---|---|---|---|
| 5,042,323 A | * | 8/1991 | Murano et al. | 477/45 |
| 5,207,306 A | * | 5/1993 | Sato et al. | 477/174 |
| 5,758,758 A | * | 6/1998 | Friedrich | 192/85.57 |
| 5,913,577 A | * | 6/1999 | Arndt | 303/117.1 |

(Continued)

FOREIGN PATENT DOCUMENTS

| | | |
|---|---|---|
| DE | 10316419 | 11/2003 |
| DE | 102007003902 | 7/2008 |

(Continued)

OTHER PUBLICATIONS

International Search Report, PCT International Application No. PCT/EP2010/068608, dated Mar. 31, 2011.

*Primary Examiner* — David A Rogers
(74) *Attorney, Agent, or Firm* — Kenyon & Kenyon LLP

(57) ABSTRACT

In a method for leak testing in an automated electrohydraulic clutch system in a motor vehicle, in which an electromechanical actuator controls the clutch travel of a clutch via a hydraulic piping system, in order that a defective system is detected reliably and rapidly, the leak in the clutch system is detected using a pressure measurement in the electromechanical actuator and compared to a characteristic clutch curve.

25 Claims, 5 Drawing Sheets

(56) References Cited

U.S. PATENT DOCUMENTS

| | | | |
|---|---|---|---|
| 6,695,748 B2* | 2/2004 | Kopec et al. | 477/130 |
| 6,948,604 B2* | 9/2005 | Puiu | 192/35 |
| 7,316,283 B2* | 1/2008 | Yamamoto et al. | 180/65.235 |
| 7,419,456 B2* | 9/2008 | Knoblauch et al. | 477/174 |
| 8,443,955 B2* | 5/2013 | Schuler et al. | 192/85.53 |
| 8,577,571 B2* | 11/2013 | Einfinger | 701/67 |
| 8,726,751 B2* | 5/2014 | Martin et al. | 74/335 |
| 8,839,934 B2* | 9/2014 | Tellermann et al. | 192/85.57 |
| 2005/0160728 A1* | 7/2005 | Puiu | 60/435 |
| 2006/0054443 A1* | 3/2006 | Kremer | 192/56.3 |
| 2006/0157315 A1* | 7/2006 | Kraxner | 192/85 C |
| 2008/0171633 A1* | 7/2008 | Gansohr et al. | 477/175 |
| 2008/0296124 A1* | 12/2008 | Schiele et al. | 192/85 R |
| 2010/0101913 A1* | 4/2010 | Schuler et al. | 192/54.3 |
| 2010/0152985 A1* | 6/2010 | Petzold et al. | 701/68 |

FOREIGN PATENT DOCUMENTS

| | | |
|---|---|---|
| DE | 102007024794 | 11/2008 |
| DE | 102008059233 | 6/2009 |
| FR | 2906330 | 3/2008 |
| WO | WO/03/087616 | 10/2003 |

* cited by examiner

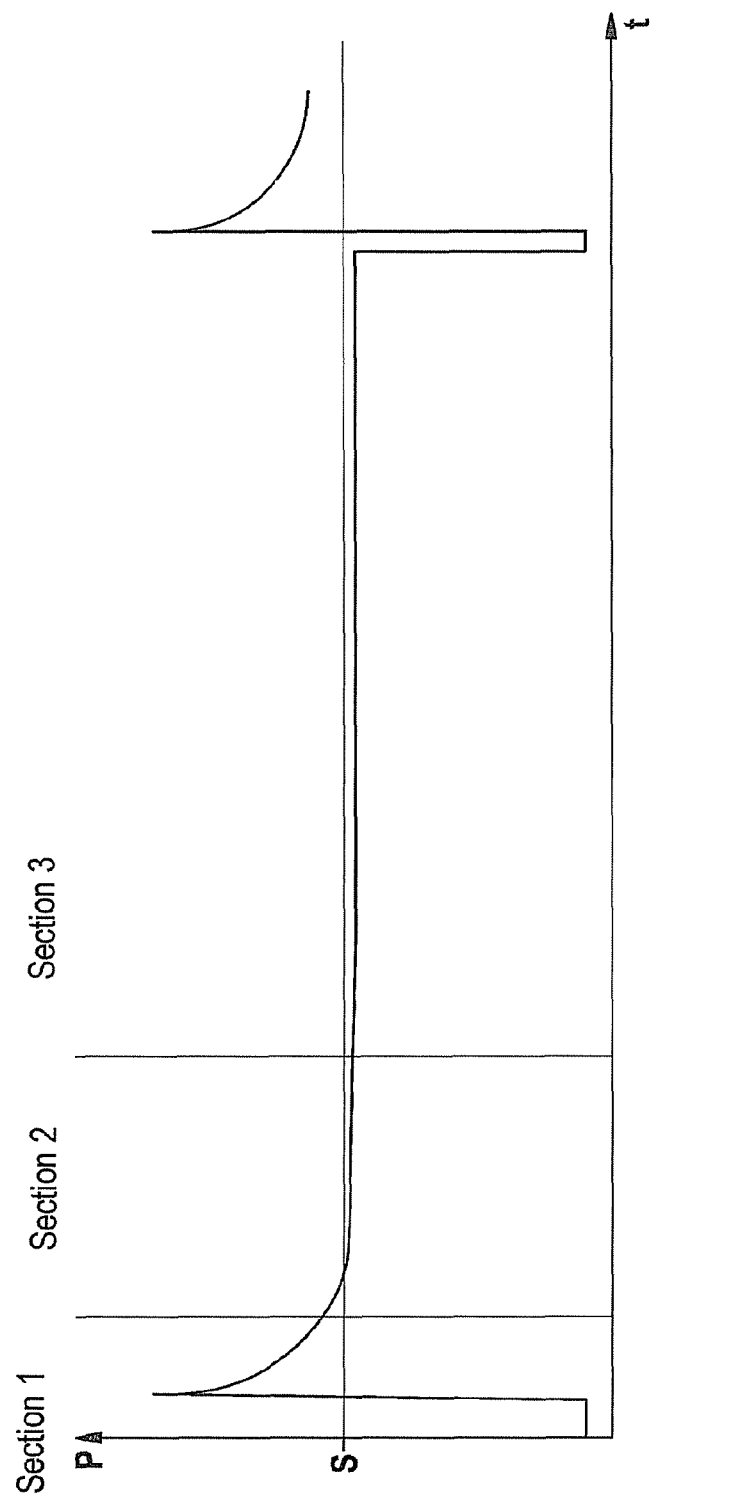

METHOD AND DEVICE FOR LEAK TESTING IN AN AUTOMATED ELECTROHYDRAULIC CLUTCH SYSTEM IN A MOTOR VEHICLE

CROSS-REFERENCE TO RELATED APPLICATIONS

The present application is the national stage entry of International Patent Application No. PCT/EP2010/068608, filed on Dec. 1, 2010, and claims priority to Application No. DE 10 2009 055 161.1, filed in the Federal Republic of Germany on Dec. 22, 2009.

FIELD OF INVENTION

The present invention relates to a method for leak testing in an automated electrohydraulic clutch system in a motor vehicle, in which an electromechanical actuator controls the clutch travel of a clutch via a hydraulic piping system, and a device for implementing the method.

BACKGROUND INFORMATION

In automatic clutch systems, the disengagement travel at the clutch disk is determined; the friction torque at the clutch being controlled using this disengagement travel. In this context, the clutch is operated by an electromechanical actuator, which is controlled by a control unit, and whose forces are hydraulically transmitted to the clutch. To directly determine the travel at the disengaging clutch disk, a displacement sensor system is situated at the clutch disk, if possible.

In addition, indirect methods for determining the travel at the disengaging clutch disk are known, in which absolute and/or incremental displacement pickups are placed in the mechanical part of the electromechanical actuator. In this context, in one specific embodiment, the zero position of the mechanical part of the electromechanical actuator is fixed by a mechanical limit stop. By actuating the electromechanical actuator against the limit stop and measuring the applied actuation energy, the zero position is electronically detected and taken as a basis for the further measurements.

Under ideal conditions, in which incompressibility of the fluid and a rigid system are assumed, and where the system also does not have any leaks, the distance which the mechanical part of the electromechanical actuator travels is proportional to the distance which the disengagement system travels. However, in real clutch systems, disturbances due to air, temperature, elasticities and leaks occur, so that the position of the clutch measured by the sensor system does not correspond to the actual position of the clutch.

The disturbances triggered by air, temperature and elasticities are normally compensated for by adaptations. Disturbances due to leakage may not be permanently compensated for and must therefore be detected, in order to identify a defective system.

SUMMARY OF THE INVENTION

The method of the present invention for leak testing of an automated clutch system in a motor vehicle has an advantage that a defective system is detected reliably and rapidly and may optionally be replaced. Since the leak in the clutch system is detected by measuring pressure in the electromechanical actuator, it is ensured that a lack of agreement in the travel correlation between the electromechanical actuator and the clutch may be detected rapidly and reliably by comparing the pressure measurement to a characteristic clutch curve. Such lack of agreement leads to the clutch travel necessary for opening and closing not being set correctly. The timely detection of such a disturbance prevents the clutch from being operated in a slipping state for a relatively long time. Thus, the early detection of the defect extends the service life of the clutch. In addition, failed or uncomfortable clutch operations due to an inadequate setting of the desired torque are prevented. The imperviousness of the hydraulic clutch system is required for the relationship between the travel of the electromechanical actuator and the adjusted clutch system to be reproducible.

A maximum pressure of the electrohydraulic clutch system is advantageously ascertained, and subsequently, based on the maximum pressure, a starting pressure point is determined which constitutes a starting point for a pressure measurement; a pressure change being measured in a predetermined time, and the pressure change being compared to a threshold value, and a leak been detected in response to the threshold value being exceeded. System-specific differences in individual automated clutch systems are measured by determining the maximum pressure. The level of the maximum pressure varies with the specific embodiment and the system state of the clutch system. In this manner, it is ensured that the starting pressure point selected as a starting point for the pressure measurement is also in a pressure range, which is suitable for the testing. The proposed method is particularly robust with regard to the detection of leaks, since it responds to any change in the clutch system.

In one exemplary embodiment, the pressure change is determined on the basis of the starting pressure point, given a predetermined travel of the electromechanical actuator. Given an intact pressure sensor, if the pressure changes suddenly with respect to the starting pressure point, then a leak may be deduced with certainty.

In another exemplary embodiment, the starting pressure point is situated in a region of a steep pressure gradient over the travel of the electromechanical actuator. Consequently, pressure changes due to leaks may be measured reliably in the clutch system and evaluated.

In one further exemplary embodiment, a characteristic curve, which represents the pressure of the electromechanical actuator as a function of the travel of the electromechanical actuator, is recorded prior to the start of measurements, the starting pressure point being determined on the basis of the maximum pressure ascertained with the aid of the characteristic curve. The pressure curve in the hydraulic clutch system may be determined very easily with the aid of the characteristic curve, which means that both the maximum pressure and other regions of the characteristic curve, which are particularly suitable for the leak testing, may be detected. Depending on the characteristic of the leak, during the leak testing, the characteristic curve of the clutch system may be run through from the point of being held open to the point where the clutch is completely closed.

In addition, a defective clutch system is deduced in the absence of a local pressure maximum of the characteristic curve. In this context, the characteristic curve corresponds to a 3rd-degree polynomial and results from the contact pressure characteristic of a cup spring of the clutch system. Consequently, larger leaks may be detected very easily. Such a clutch system must be replaced immediately, since it does not meet the safety requirements in the motor vehicle.

In yet another exemplary embodiment, the predetermined time period for determining the pressure change is varied. Measuring the pressure changes in different time periods allows the leak testing to be optimized. If the leak testing is subdivided into different time periods, the accuracy of the test result improves, and the flexibility of the testing is increased.

A first time period for determining a first pressure change is advantageously set during a hysteresis jump of the characteristic curve, while outside of the hysteresis jump of the characteristic curve, a second time period for determining a second pressure change is set; the first time period for determining the first pressure change being smaller than the second time period for determining the second pressure change. Using the measurement of the first pressure change in a short time period, it is determined, by an immediate test, whether or not the clutch system is functioning correctly. The measurement of the second pressure change in the longer, second time period verifies the test of the first pressure change and is therefore more exact.

In a further exemplary embodiment, the first pressure change is measured during the hysteresis jump of the characteristic curve; if the first pressure change exceeds the threshold value, a measurement of the second pressure change during the second time period advantageously may be omitted. Therefore, it is possible to rapidly classify the clutch system as functioning correctly or not functioning correctly, as is used, for example, in end-of-line tests.

In one further exemplary embodiment, only the second pressure change during the second time period is determined, the second pressure change occurring outside of the hysteresis jump of the characteristic curve. Consequently, a considerably more thorough leak test is conducted, as is advantageous for garages or customer service. However, such a method may also be advantageously used for diagnostic purposes.

In another exemplary embodiment, the pressure measurement takes place while the vehicle is stationary. A complete run-through of the characteristic curve of the automated clutch system, in which the clutch may be opened and closed again, is only meaningfully possible when the vehicle is stationary.

A further exemplary embodiment of the present invention relates to a device for leak testing in an automated electrohydraulic clutch system in a motor vehicle, in which an electromechanical actuator controls the clutch travel of a clutch via a hydraulic piping system. In order to be able to conduct an accurate leak test of the clutch system, means are available, which detect the leak in the clutch system by measuring pressure in the electromechanical actuator. The advantage of this is that the timely detection of such a disturbance prevents the clutch from being operated in a slipping state for a relatively long time. Thus, the early detection of the defect extends the service life of the clutch. In addition, failed or uncomfortable clutch operations due to an inadequate adjustment of the desired torque of the clutch are prevented. The imperviousness of the hydraulic clutch system is a requirement for the relationship between the travel of the electromechanical actuator and the regulated clutch system to be reproducible.

A pressure sensor, which is connected to a control unit for determining a leak of the clutch system, is advantageously situated in a hydraulic part of the electromechanical actuator. Since a pressure sensor is, structurally, a very small unit, only a negligibly greater amount of space is required for it in the electromechanical actuator. Therefore, the need for structural design changes of the electromechanical actuator is eliminated.

In a further exemplary embodiment, the electromechanical actuator and the clutch are physically separated and interconnected by at least one line containing a hydraulic fluid. The spatial separation of the electromechanical transducer and the clutch allows the individual components to be implemented considerably more easily in the overall structural design of a vehicle, since they may be positioned so as to save space.

In another exemplary embodiment, the clutch takes the form of a separating clutch, which connects or decouples the power train of the vehicle to or from an internal combustion engine, the power train being driven by an electric motor. Such separating clutches are used in hybrid vehicles, and there, they form a central element for the drive unit of the vehicle.

The present invention relates to a number of exemplary embodiments that will be explained in further detail below in view of the accompanying drawings, in which identical features are referred to with the same reference numerals.

BRIEF DESCRIPTION OF THE DRAWINGS

FIG. 5 shows a pressure-versus-time curve for detecting a leak in an automated clutch system.

DETAILED DESCRIPTION

Figure 1:
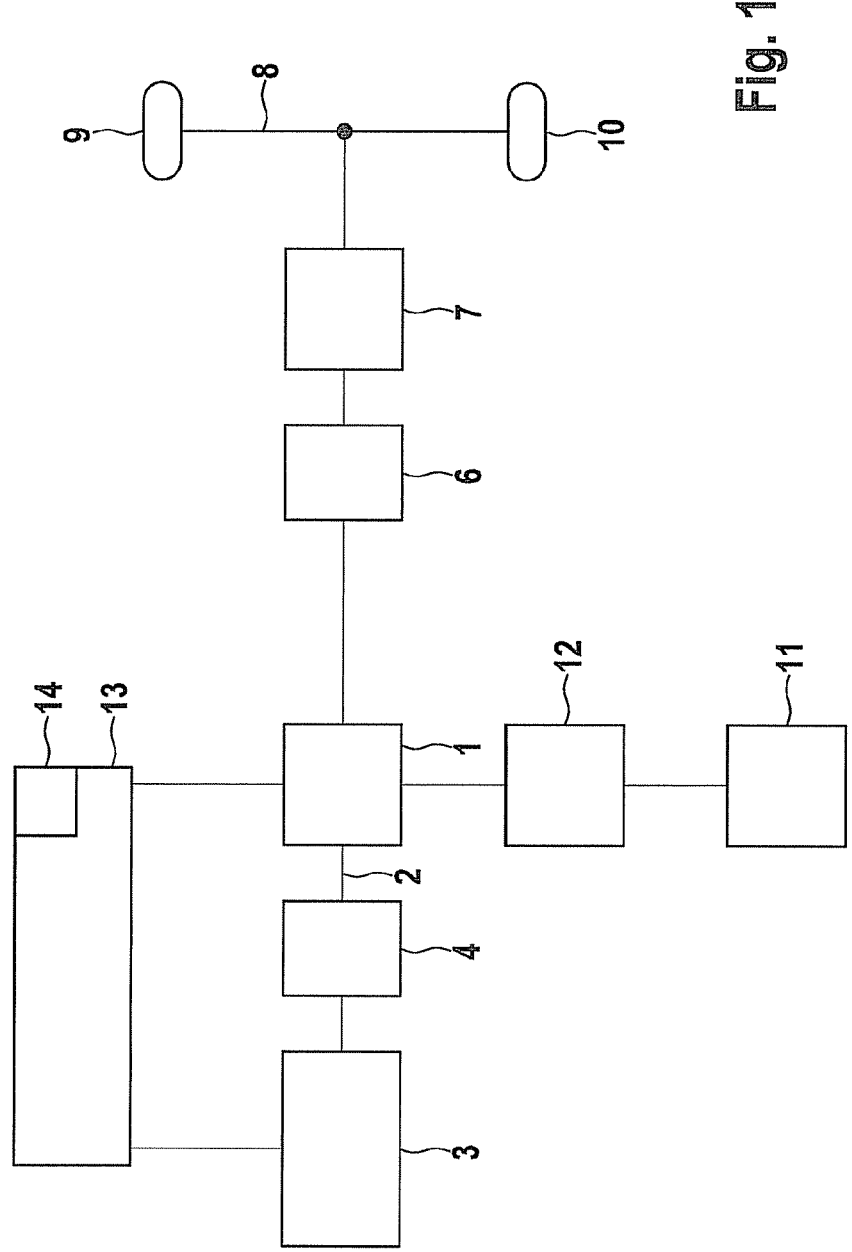
FIG. 1 shows a schematic representation of a hybrid vehicle configured as a parallel hybrid.

FIG. 1 shows a hybrid vehicle configured as a parallel hybrid. In this embodiment, an electric motor 1 is situated on drive shaft 2 of an internal combustion engine 3. Combustion engine 3 is connected to electric motor 1 by a separating clutch 4. Electric motor 1 leads to a power take-up element 6, which is connected to a transmission 7. Transmission 7 leads to an axle 8, on which the wheels 9, 10 are situated that are driven by the described power train.

Electric motor 1 is powered by a high-voltage battery 11, which is connected to electric motor 1 via an inverter 12. Electric motor 1 and combustion engine 3 are controlled by a control unit 13. Control unit 13 includes a memory 14, in which characteristic curves for different operating parameters are stored.

There are various operating modes, in which a parallel hybrid may be operated. A first operating mode, in which separating clutch 4 is open and combustion engine 3 is disconnected from the power train and automatically stopped, is referred to as eDrive, since the hybrid vehicle is propelled purely electrically by motively-operated electric motor 1 and the energy stored in high-voltage battery 11. If there is a demand for power that can no longer be supplied by the electric motor 1 alone, combustion engine 3 is automatically started and coupled to the power train, which is accomplished by closing separating clutch 4. Combustion engine 3 now contributes to propelling the hybrid vehicle.

Figure 2:
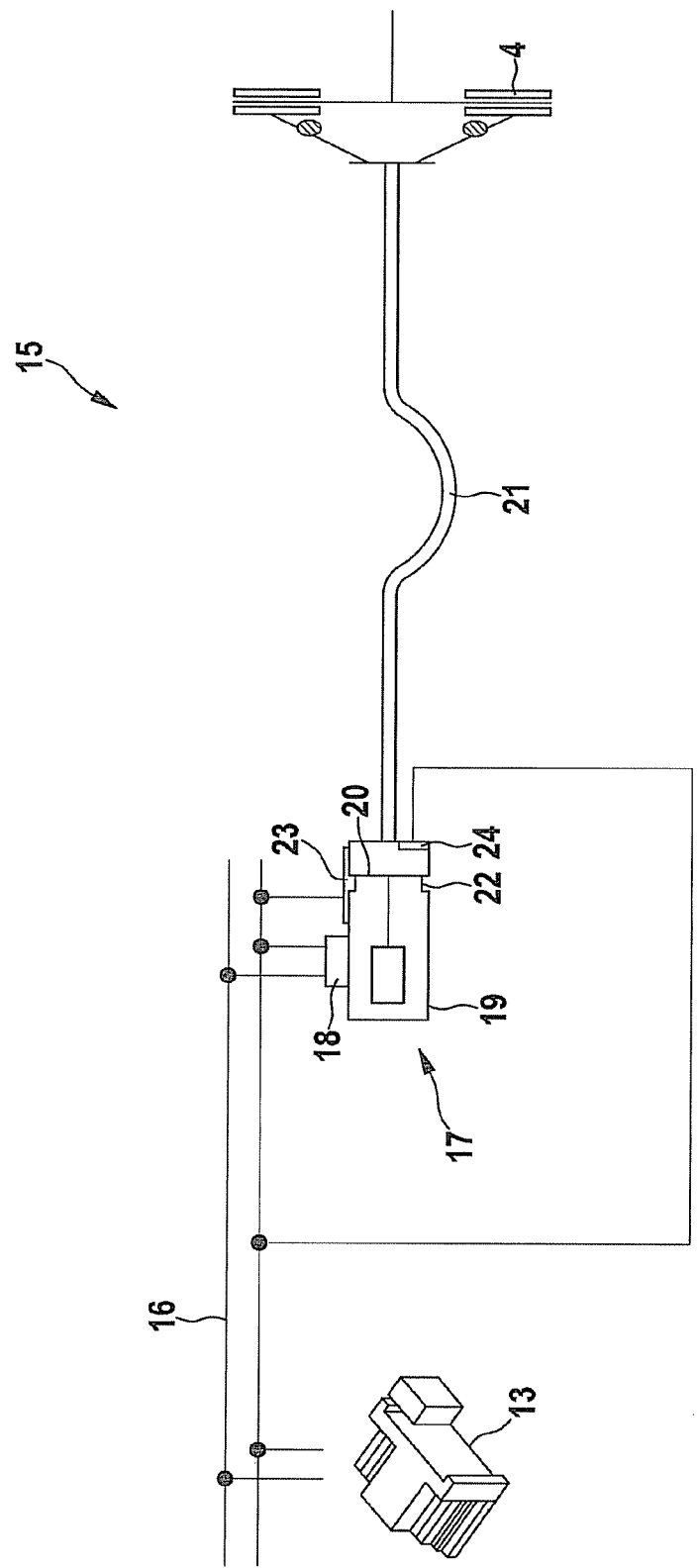
FIG. 2 shows a basic representation of an automated clutch system.

The automated clutch system 15 including separating clutch 4 is illustrated in further detail in FIG. 2. Control unit 13 is connected to an electrohydraulic control element 17 via a communications network 16, which may take the form of a CAN bus, for example. This electrohydraulic control element 17 has an electric circuit 18 and a hydraulic master cylinder 19; the electrical signals output by control unit 13 being converted into a movement of hydraulic master cylinder 19, which means that the hydraulic fluid situated in hydraulic master cylinder 19 is moved in the overall hydraulic system with the aid of a piston 20; and hydraulic master cylinder 19 being connected to a hydraulic piping system 21. Hydraulic piping system 21 connects electrohydraulic control element 17 to separating clutch 4, which are both situated in the vehicle so as to be spatially separated; the hydraulic actuating signals of electrohydraulic control element 17 being transmitted through hydraulic piping system 21 to separating clutch 4 and being implemented by the separating clutch.

Hydraulic master cylinder 19, a slave cylinder not illustrated further in the drawing, the piping system 21 made up of rigid and flexible lines, as well as connecting pieces of the lines not differentiated any further, belong to the overall hydraulic system.

Electrohydraulic control element 17 has a compensating opening 22 (expansion port), which is opened or closed in response to the movement of piston 20 of master cylinder 19 and communicates, in the open state, with an equalizing reservoir of the hydraulic system that is not illustrated further. Upon the movement of piston 20 out of its neutral position, this compensating opening 22 is passed, which means that the connection between the equalizing reservoir and hydraulic piping system 21 is interrupted. Separating clutch 4 is mechanically designed to be closed when nonpressurized.

In addition, a displacement sensor 23, which determines the travel of piston 20 based on a zero position, is situated at hydraulic master cylinder 19. Furthermore, a pressure sensor 24 measures the total pressure in the overall hydraulic system. This pressure sensor 24 is situated in the displacement region of piston 20 of master cylinder 19. Both displacement sensor 23 and pressure sensor 24 are connected to control unit 13 by communications network 16.

Figure 3:
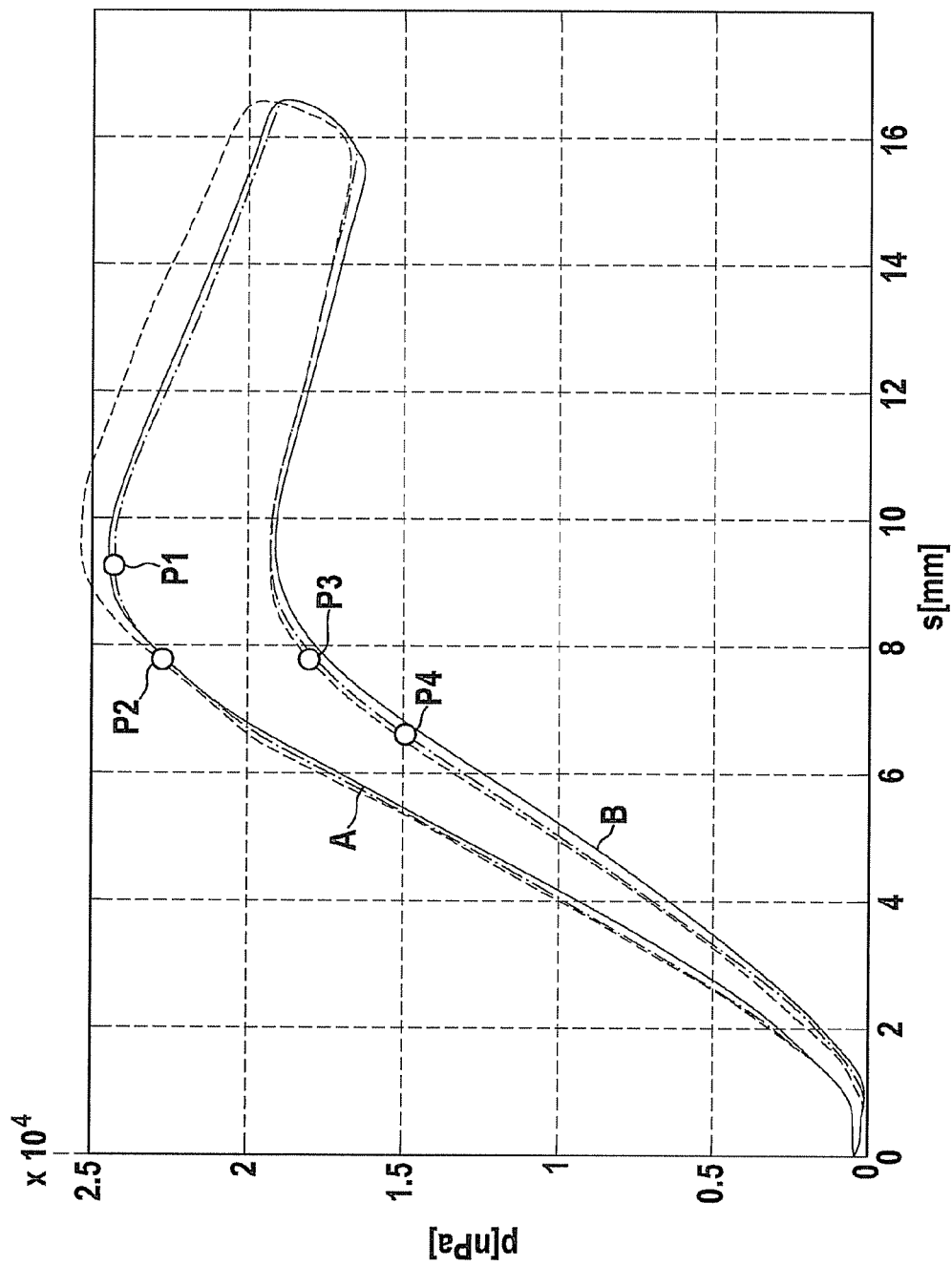
FIG. 3 shows a pressure-versus-travel clutch characteristic of an automated clutch system.

In order to better clarify the different operating states, which may occur during the use of an automated clutch system in a vehicle, reference is made to FIG. 3. A characteristic curve represents a relationship between the pressure measured in master cylinder 19 of electrohydraulic actuator 17 by pressure sensor 24 and the distance moved by piston 20 of master cylinder 19. This occurs at a rotational speed of n=0 rpm, that is, in an unloaded state of separating clutch 4. As is apparent from this, compensating bore 22 is closed. The further travel of piston 20 results in a pressure increase in accordance with the characteristic curve of a cup spring of separating clutch 4 not illustrated in further detail; branch A of the characteristic curve being recorded during the opening of separating clutch 4, while branch B being detected during the closing of separating clutch 4.

Figure 4:
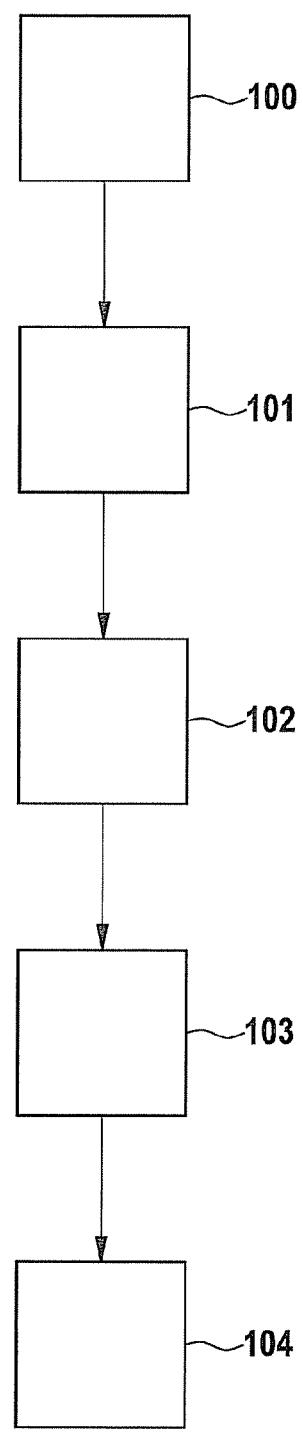
FIG. 4 shows a schematic flow chart for the leak testing of an automated clutch system.

The leak testing shall be discussed in further detail in light of FIG. 4. In step 100, the pressure-travel characteristic of the automated clutch system is recorded in the case of a stationary vehicle, in which separating clutch 4 is in an unloaded state. In step 101, the initially closed separating clutch 4 is opened; a hysteresis of the cup spring of separating clutch 4 having to be overcome, which means that branch A of the characteristic is run through and a maximum pressure is detected. In FIG. 3, the maximum pressure is denoted as point P1. If the automated clutch system has not been operated over a relatively long period of time, a pressure level above point P1 may even be detected. In the pressure curve, the characteristic of the first movement of separating clutch 4 deviates towards higher pressures with respect to subsequent actuating instances.

In step 102, a starting pressure point P2 is set as a starting point for the leak measurement and approached. This starting point P2 (FIG. 3) is at an applicable distance from maximum pressure P1 on branch A, which corresponds to opened separating clutch 4. If a loss of volume within the hydraulic clutch system occurs due to leakage or a change in density of the operating medium, then, in step 103, a pressure change is detected, which is situated on the characteristic curve, on a vertical line between point P2 and point P3 in FIG. 3. If the hysteresis jump is completed, then a further loss of volume produces a further pressure change along branch B of the characteristic curve up to point P4, which is detected in step 104.

All of the points represented in FIG. 3 are selected by way of example, and in a different specific embodiment, they may have a geometrically different position. Depending on the characteristic of the leak, the entire characteristic curve of separating clutch 4 may be run through during the leak testing.

The time characteristic of such a leak test is represented in FIG. 5. Section 1 of FIG. 5 shows a relatively large pressure difference in response to a small volume change, due to the hysteresis jump of separating clutch 4, according to the pressure difference between points P2 and P3 in FIG. 3. A movement of the pressure along the clutch characteristic curve is illustrated in section 2, which corresponds to a pressure change between points P3 and P4 in FIG. 3. In section 3, the pressure no longer changes, since no more volume change occurs.

In the leak testing described in FIG. 4, it is assumed that the time period for measuring the pressure changes is always constant. However, the time period may also be varied as a function of the desired application case. Thus, pressure change $\Delta p1$, which is measured in section 1 of FIG. 5, is measured in a relatively short time period t1. Pressure change $\Delta p1$ is compared to a first pressure-change threshold value Sp1. If pressure change $\Delta p1$ is greater than pressure-change threshold value Sp1, the separating clutch system is classified as defective, since a leak probably exists. If pressure change $\Delta p1$ is less than pressure-change threshold value Sp1, a further pressure measurement is carried out in section 2; the pressure change $\Delta p2$ measured in section 2 being carried out over a time period t2, which is considerably longer than the time period t1 used in section 1. Thus, the evaluation of the pressure change in section 1 constitutes a rapid method, in which only the hysteresis jump is considered; the rapid method being able to be applied particularly easily in an end-of-line test of the automated clutch system. Consequently, the evaluation of pressure change $\Delta p2$ in section 2 by moving along branch B of the characteristic curve constitutes a more thorough method and is particularly suitable for application in the garage and in customer service. In the test in section 2, pressure change $\Delta p2$ is also compared to a second pressure-change threshold value Sp2, in order to determine if the clutch system is usable or defective. Pressure-change threshold values Sp1 and Sp2 represent variables that may be applied.

What is claimed is:

1. A method for leak testing in an automated electrohydraulic clutch system in a motor vehicle, comprising:
    controlling a clutch travel of a clutch by an electromechanical actuator via a hydraulic piping system;
    detecting a leak in the clutch system using a pressure measurement in the electromechanical actuators;
    ascertaining a maximum pressure of the electrohydraulic clutch system;
    determining a starting pressure point for pressure measurement based on the maximum pressure;
    measuring a pressure change over a predetermined time;
    comparing the pressure change to a threshold value; and
    detecting a leak in response to the threshold value being exceeded.

2. The method according to claim 1, wherein the pressure measurement takes place while the vehicle is stationary.

3. The method according to claim 1, wherein the pressure change is determined on a basis of the starting pressure point, given a predetermined travel of the electromechanical actuator.

4. The method according to claim 3, wherein the starting pressure point is situated in a region of a steep pressure gradient over the travel of the electromechanical actuator.

5. The method according to claim 3, wherein a characteristic curve, which represents a pressure of the electromechanical actuator as a function of the travel of the electromechanical actuator, is recorded prior to a start of measurement, and wherein the starting pressure point is determined based on the maximum pressure ascertained with the aid of the characteristic curve.

6. The method according to claim 5, further comprising:
    deducing a defective clutch system in an absence of a local pressure maximum.

7. The method according to claim 1, further comprising:
    varying the predetermined time for determining the pressure change.

8. The device according to claim 7, wherein it is deduced that there is a defective clutch system in an absence of a local pressure maximum.

9. The method according to claim 7, wherein a first time period for determining a first pressure change is set during a hysteresis jump of the characteristic curve, while outside of the hysteresis jump of the characteristic curve, a second time period for determining a second pressure change is set; the first time period for determining the first pressure change being smaller than the second time period for determining the second pressure change.

10. The method according to claim 9, wherein the first pressure change is measured during the hysteresis jump of the characteristic curve, and
    if the first pressure change exceeds the threshold value, a measurement of the second pressure change during the second time period is omitted.

11. The method according to claim 9, wherein only the second pressure change during the second time period is determined, the second pressure change occurring outside of the hysteresis jump of the characteristic curve.

12. A device for leak testing in an automated electrohydraulic clutch system in a motor vehicle, comprising:
    an electromechanical actuator configured to control a clutch travel of a clutch via a hydraulic piping system; and
    a control unit and pressure sensor configured to detect a leak in the clutch system using a pressure measurement in the electromechanical actuator, to ascertain a maximum pressure of the electrohydraulic clutch system, to determine a starting pressure point for pressure measurement based on the maximum pressure, to measure a pressure change over a predetermined time, to compare the pressure change to a threshold value, and to detect a leak in response to the threshold value being exceeded.

13. The device according to claim 12, wherein the pressure sensor is situated in a hydraulic part of the electromechanical actuator, the pressure sensor being connected to the control unit for determining the leak in the clutch system.

14. The device according to claim 12, wherein the electromechanical actuator and the clutch are physically separated and interconnected by a line containing a hydraulic fluid.

15. The device according to claim 12, wherein the clutch is a separating clutch, which connects or decouples a power train of the vehicle to or from an internal combustion engine, the power train being driven by an electric motor.

16. The device according to claim 12, wherein the pressure measurement takes place while the vehicle is stationary.

17. The device according to claim 12, wherein the pressure sensor is situated in a hydraulic part of the electromechanical actuator, the pressure sensor being connected to the control unit for determining the leak in the clutch system, and wherein the electromechanical actuator and the clutch are physically separated and interconnected by a line containing a hydraulic fluid.

18. The device according to claim 17, wherein the clutch is a separating clutch, which connects or decouples a power train of the vehicle to or from an internal combustion engine, the power train being driven by an electric motor.

19. The device according to claim 12, wherein the pressure change is determined based on the starting pressure point, given a predetermined travel of the electromechanical actuator.

20. The device according to claim 19, wherein the starting pressure point is situated in a region of a steep pressure gradient over the travel of the electromechanical actuator.

21. The device according to claim 19, wherein a characteristic curve, which represents a pressure of the electromechanical actuator as a function of the travel of the electromechanical actuator, is recorded prior to a start of measurement, and wherein the starting pressure point is determined based on the maximum pressure ascertained with the aid of the characteristic curve.

22. The device according to claim 12, wherein the predetermined time for determining the pressure change is varied.

23. The device according to claim 22, wherein a first time period for determining a first pressure change is set during a hysteresis jump of the characteristic curve, while outside of the hysteresis jump of the characteristic curve, a second time period for determining a second pressure change is set; the first time period for determining the first pressure change being smaller than the second time period for determining the second pressure change.

24. The device according to claim 23, wherein the first pressure change is measured during the hysteresis jump of the characteristic curve, and if the first pressure change exceeds the threshold value, a measurement of the second pressure change during the second time period is omitted.

25. The device according to claim 23, wherein only the second pressure change during the second time period is determined, the second pressure change occurring outside of the hysteresis jump of the characteristic curve.

* * * * *